United States Patent
Ebert (10) Patent No.: US 6,539,423 B1
(45) Date of Patent: Mar. 25, 2003

(54) METHODS AND SYSTEMS FOR GENERATING INTERACTIVE INFORMATION FORMATTED FOR A DEVICE

(75) Inventor: Peter Ebert, Menlo Park, CA (US)

(73) Assignee: SAP Aktiengesellschaft, Walldorf (DE)

(*) Notice: Subject to any disclaimer, the term of this patent is extended or adjusted under 35 U.S.C. 154(b) by 0 days.

(21) Appl. No.: 09/405,136

(22) Filed: Sep. 24, 1999

(51) Int. Cl.[7] .............................................. G06F 15/16
(52) U.S. Cl. ...................................... 709/219; 709/245
(58) Field of Search ................................. 709/213, 245, 709/202, 227, 228, 229, 217, 219, 247, 201, 203; 707/513

(56) References Cited

U.S. PATENT DOCUMENTS

| | | | | |
|---|---|---|---|---|
| 5,063,523 A | * | 11/1991 | Vrenjak | 709/223 |
| 5,666,486 A | * | 9/1997 | Alfieri et al. | 709/217 |
| 5,761,280 A | * | 6/1998 | Noonen et al. | 379/93.27 |
| 5,764,910 A | * | 6/1998 | Shachar | 709/247 |
| 5,790,790 A | * | 8/1998 | Smith et al. | 709/206 |
| 5,804,803 A | * | 9/1998 | Cragun et al. | 707/513 |
| 5,812,776 A | * | 9/1998 | Gifford | 709/217 |
| 5,974,453 A | * | 10/1999 | Andersen et al. | 709/228 |
| 6,061,721 A | * | 5/2000 | Ismael et al. | 709/223 |
| 6,061,738 A | * | 5/2000 | Osaku et al. | 709/245 |
| 6,094,684 A | * | 7/2000 | Pallmann | 709/227 |
| 6,119,167 A | * | 9/2000 | Boyle et al. | 709/203 |
| 6,167,448 A | * | 12/2000 | Hemphill et al. | 709/224 |
| 6,185,600 B1 | * | 2/2001 | Spence et al. | 709/203 |
| 6,195,696 B1 | * | 2/2001 | Baber et al. | 709/223 |
| 6,356,905 B1 | * | 3/2002 | Gershman et al. | 709/219 |

OTHER PUBLICATIONS

Ullmer, B. et al.; "mediaBlocks: physical containers, transports, and controls for online media", Proceedings of the 25th annual International Conference on Computer Graphics and Interactive Techniques, 1998; ISBN 0–89791–999–8, pp. 379–386.*

* cited by examiner

Primary Examiner—Mark H. Rinehart
Assistant Examiner—Marc D. Thompson
(74) Attorney, Agent, or Firm—Finnegan, Henderson, Farabow, Garrett & Dunner, L.L.P.

(57) ABSTRACT

A smart molecule system that may be embedded in a physical device in order to integrate information from external information sources in the physical device. The smart molecule system obtains information from external sources by connecting to a smart molecule service in a computer system through a URL to Number Transformation Algorithm (UNT) number. The UNT performs bidirectional transformation between the UNT number and a corresponding URL, thereby enabling physical devices with smart molecule to obtain information from the Web without using alphanumeric characters. Upon creating the UNT number and assigning it to an information source, a service provider distributes the UNT number to the smart molecule in order for the smart molecule to access the information stored therein.

29 Claims, 8 Drawing Sheets

TCP/IP Layering Model

X XXX XXY YYYZ
1 800 129 4561

FIG.3D 1800 123 4561 <==> https://www.180012.coms/s?p=3456
1745 136 3450 <==> http://www.174513.com/s?p=6345

METHODS AND SYSTEMS FOR GENERATING INTERACTIVE INFORMATION FORMATTED FOR A DEVICE

FIELD OF THE INVENTION

This invention relates to a computer system and more particularly to a smart molecule system embedded in any physical object and assigned to one or more external information sources in order to interact with and integrate dynamic information in the physical object.

BACKGROUND OF THE INVENTION

Advances in computer processing power and network communications have made information from a wide variety sources available to users on most computer systems. Computer networking enables computer users to access information stored in distant databases and to share information, software applications and hardware devices with other users attached to the network. Today, computers connected to the Internet have almost instant access to information stored in relatively distant regions. Moreover, computers connected to networks other than the Internet also have access to information stored on those networks. In order to access information on a computer network, physical media such as cables or wireless methods must connect each computer to the network. In addition, network computers usually have monitors or other display devices that enables the users to access and change information.

As information technology improves, physical devices such as televisions, VCRs, cameras, phones, radios, clocks and compact disc players, among others, may be adapted to include more information and functions. At this time, some physical devices include systems that enable them to perform one or more predefined tasks. However, these devices cannot be easily adapted to perform other tasks. As the size and affordability of processors in these systems continue to decrease, more physical devices may contain systems that are powerful enough to enable them to join a network of other physical devices.

Jini™ Technology from Sun Microsystems Corporation, provides a mechanism which enables independent systems to connect together in order to form an impromptu network. Each system provides interfaces and flexible services that may be used by other systems in the Jini™ network. With Jini™ technology, it is feasible to build a network of systems without an intermediary "computer system" and without prior installation procedures and hardware.

According to Jini™, when each system in the network is created, it must conform to certain underlying protocol. Jini™ connection architecture requires a protocol that enables each system in the Jini™ network to discover a lookup service and to join the lookup service. When a system is connected to a Jini™ network, the system must first locate the lookup service. Upon discovering the lookup service, the system then joins the network by loading all of its interfaces into a lookup service menu. The lookup service thereafter acts as a switchboard by connecting a server system (system providing service to another system) to a client system (system requesting service from another system). When a service is requested, the server system interfaces are copied from the lookup service menu to the requesting client system. Thereafter, the lookup service is not involved in any of the resulting interactions between the client and server systems. Since each system conforms to the Jini™ protocol, interaction is ensured and current installation drivers and procedures are not utilized.

Software in these devices must be implemented in Java™ programming language, which provides the underling object model used by Jini™ technology. Jini™ also requires Java™ Remote Method Invocation (RMI) technology in order to move between Java™ virtual machines, software objects associated with the lookup service, and other Jini™ network services and devices.

Jini™ technology suffers from several drawbacks, for example, current processors in current systems cannot be adapted to access Jini™ network. Moreover, by requiring software in systems that are compatible with Jini™ technology to be implemented in the Java programming language, Jini™ technology introduces a limitation unacceptable for many manufacturers. The use of non-compatible technology may also slow down the migration by these manufacturers from currently used programming languages to Java™ programming language. Additionally, there are current standard protocols, such as, TCP/IP/HTTP, SMTP, and FTP, which are already widely accepted in the computer industry, and which may already be used by manufacturers. What is needed therefore is a system using current standard protocols that integrates information from one or more information sources into a physical device.

SUMMARY OF THE INVENTION

The present invention relates to a smart molecule system that may be embedded in a physical device in order to integrate information from external information sources in the physical device. The smart molecule system obtains information from external sources by connecting to a smart molecule service in a computer system through a URL to Number Transformation Algorithm (UNT) number. The UNT performs bi-directional transformation between the UNT number and a corresponding URL, thereby enabling physical devices with smart molecule systems to obtain information from the Web without using alphanumeric characters. Upon creating the UNT number and assigning it to an information source, a service provider distributes the UNT number to the smart molecule in order for the smart molecule to access the information stored therein. Alternatively, a user of a physical device with alphanumeric characters may enter the URL in the physical device, connect to the smart molecule service and retrieve information from a corresponding information source through the smart molecule service.

It is an object of this invention to connect the smart molecule system with current computer networks in order to transmit information from the computer networks to the smart molecule system.

It is another object of the invention to create a UNT number, register the UNT number with the appropriate authorities, assign a parameter portion of the UNT number to an information source, set up a smart molecule service to access the information source and process the UNT number, and distribute the UNT number to smart molecule systems.

It is another object of the invention to use the UNT number to connect smart molecule software components in the smart molecule system to one or more smart molecule services in order to transmit data from the information sources to the smart molecule software components.

It is another object of the present invention to transmit data from the external information source to the smart molecule system by using standard networking protocols.

It is another object of the invention to process transmitted data on the smart molecule software component in order to identify the occurrence of a predetermined event.

It is another object of the invention to activate a physical attribute of the physical device upon the occurrence of the predetermined event.

It is another object of the invention for the smart molecule software component to transmit instructions, to perform a predefined action, to the computer network in response to an external interaction with a physical attribute of the physical device.

It is another object of the invention for the smart molecule software component collect information in a smart molecule memory and transmit the information to the computer network in response to an external interaction with a physical attribute of the physical device.

It is yet another object of the invention to extend the functionality of the smart molecule system by attaching a smart atom system that performs predefined tasks to the smart molecule system.

It is yet still another object of the invention to extend the functionality of the smart molecule system by creating a smart organism, i.e., a computer environment for allowing flexible interaction between smart molecule systems that are embedded in multiple physical objects.

Additional features and advantages of the invention will be set forth in the description that follows, and in part will be apparent from the description, or may be learned by practice of the invention. The objectives and advantages of the invention will be realized and attained by the system particularly pointed out in the written description and claims hereof as well as the appended drawings.

To achieve these and other advantages and in accordance with the purpose of the invention, as embodied and broadly described, the present invention provides a system embedded in a physical device, the system retrieving information from external information sources through a computer and integrating the external information with the physical device, the system comprises: a central processor for controlling processing operations and connecting the system to the computer, the computer having a software application for defining a service component and assigning the service component to information on at least one external information source, the service component retrieving the information from the external information source, upon receiving the information the software application formatting the information in a predetermined format and transmitting the information to the system after the system subscribes to the service component; a memory for storing information transmitted from the software application; and a software component for processing information stored in the memory in order to activate a physical attribute of the physical device in response to the occurrence of a predetermined event, the software component further instructing the software application to perform predefined tasks upon the occurrence of the predetermined event and interaction with a physical attribute of the physical device.

The invention also provides a software component in a system that is embedded in a physical device, the system retrieving information from external information sources through a computer and integrating the external information with the physical device, the software component comprises: a set of properties for defining the software component's characteristics; at least one interface to other software components and systems; a set of methods for processing information; and means for connecting to a service component in the computer, accessing information transmitted to a memory in the system from an external information source through the service component, processing information transmitted from the external information source, activating physical attributes of the physical device in response to the occurrence of a predetermined event and performing predefined functions on the computer in response to an external interaction with the one or more physical attributes of the physical device.

The invention also provides a computer environment for allowing flexible interaction of a plurality of systems, at least one system embedded in a physical device comprises: a central processor for controlling processing operations and connecting the system to the computer, the computer having a software application for defining a service component and assigning the service component to information on at least one external information source, the service component retrieving the information from the external information source, upon receiving the information the software application formatting the information in a predetermined format and transmitting the information to the system after the system subscribes to the service component; a memory for storing information transmitted from the software application; and a software component for processing information stored in the memory in order to activate a physical attribute of the physical device in response to the occurrence of a predetermined event, the software component further instructing the software application to perform predefined tasks upon the occurrence of the predetermined event and interaction with a physical attribute of the physical device.

The invention alternatively provides a system embedded in a physical device, the system retrieving information from external information sources through a computer and integrating the external information with the physical device, the system comprising: a central processor for controlling processing operations; a memory for storing information retrieved from the external information source; a software component for processing information stored in the memory; means for assigning the external information source to a service component in the computer through a set of numbers, connecting the system to the service component, transmitting information from the external information source to the memory and executing through the software component information stored in the memory; means for activating a physical attribute of the physical device in response to the occurrence of a predetermined event during execution of the information on the software component; and means for performing one or more predefined functions on the computer in response to activating the one or more physical attributes and in response to external interaction with the one or more physical attributes.

The invention further provides a method of retrieving information from external information sources through a computer and integrating the information with a system in a physical device, the method comprising the steps of: controlling processing operations through a central processor in the system; storing information retrieved from the external information source in a memory in the system; processing information stored in the memory through a software component in the system; assigning the external information source to a service component in the computer through a subset of a UNT number; connecting the system to the service component; transmitting information from the external information source to the memory and executing through the software component information stored in the memory; activating a physical attribute of the physical device in response to the occurrence of a predetermined event during execution of the information on the software component; and performing one or more predefined functions on the computer in response to the step of activating the one or more physical attributes and in response to external interaction with the one or more physical attributes.

In yet another alternative, the invention provides a system embedded in a physical device, the system retrieving information from external information sources through a computer and integrating the external information with the physical device, the system comprises: a central processor for controlling processing operations and connecting the system to the computer, the computer having a software application for defining a service component and assigning the service component to information on at least one external information source, the service component retrieving the information from the external information source, upon receiving the information the software application formatting the information in a predetermined format and transmitting the information to the system after the system subscribes to the service component; a memory for storing information transmitted from the software application; and a software component for periodically transmitting information stored in the memory to the software application and/or to the service component, the software application and or service component further processing the transmitted information or distributing it to external sources.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention.

In the drawings:

FIG. 3-A illustrates a smart molecule system that is embedded in a stock clock and connected to the computer network of FIG. 1;

FIG. 3-B further illustrates the stock-clock smart molecule system of FIG. 3-A;

FIG. 3-C illustrates a UNT number format utilized according to the preferred embodiment of the invention;

FIG. 3-D illustrates how the UNT number and the corresponding URL are used in the stock-clock smart molecule system of FIG. 3-A;

DETAILED DESCRIPTION

Reference will now be made in detail to the preferred embodiments of the present invention, examples of which are illustrated in the accompanying drawings. The present invention described below extends the functionality of the inventive smart molecule system and methods for utilizing the system.

Figure 1:
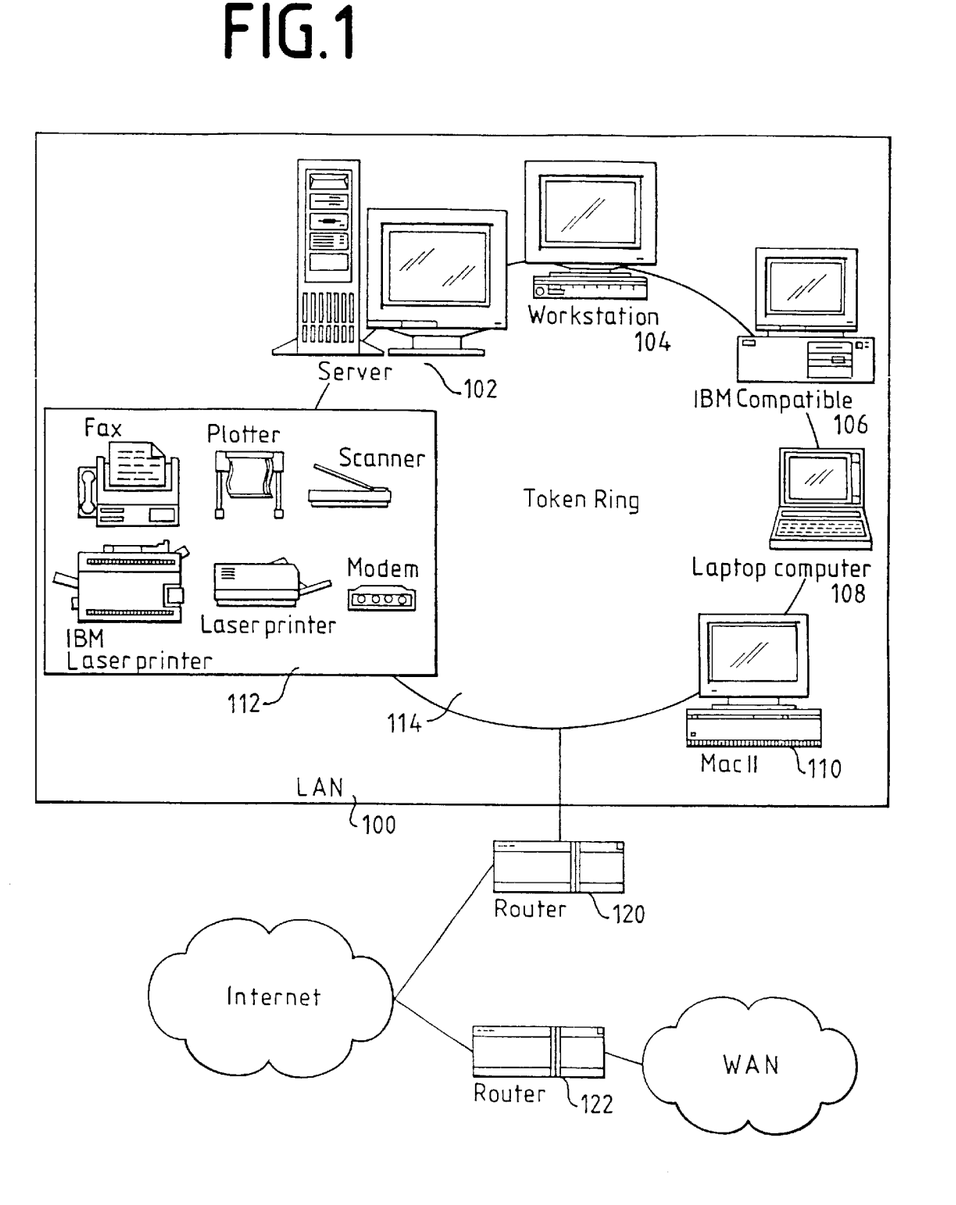
FIG. 1 illustrates the computer network in which the inventive smart molecule system may be incorporated.

FIG. 1 is an example of a local area network (LAN) 100 that is configured to transmit information to components inside and outside of LAN 100. It comprises a server 102, four computer systems 104–110, and peripherals, such as printers and other devices 112, that may be shared by components on LAN 100. Computer systems 104–110 may serve as clients for server 102 and/or as clients and/or servers for each other and/or for other components connected to LAN 100. Components on LAN 100 are preferably connected together by cable media, for example copper or fiber-optic cable, and the network typology may be a token ring topology 114. It should be apparent to those of ordinary skill in the art that other media, for example, wireless media, such as optical and radio frequency, may also connect LAN 100 components. It should also be apparent that other network topologies, such as Ethernet, may be used.

Data may be transferred between components on LAN 100 in packets, i.e., blocks of data that are individually transmitted over LAN 100. Routers 120, 122 create an expanded network by connecting LAN 100 to other computer networks, such as the Internet, other LANs or Wide Area Networks (WAN). Routers are hardware devices that may include a conventional processor, memory, and separate I/O interface for each network to which it connects. Router 120, 122 may also include a packet filter which is used as the primary part of a firewall that protects LAN 100 against unwanted Internet traffic. In LAN 100, server 102 is a web server for retrieving documents from the Internet. As would be apparent to those of ordinary skill in the art, web server 102 may reside inside or outside of LAN 100 Internet firewall.

Figure 2:
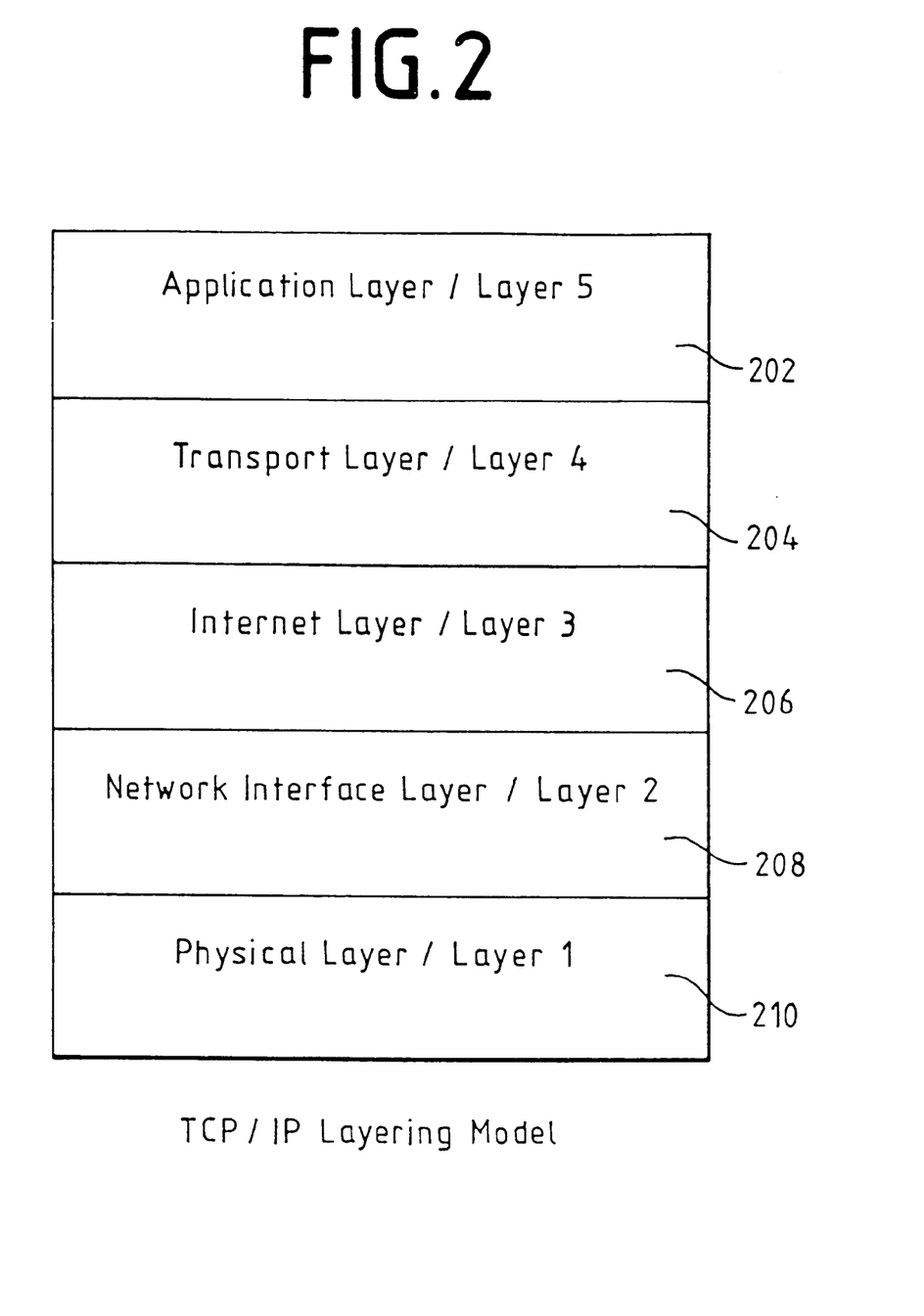
FIG. 2 illustrates the TCP/IP Layering Model Protocol used during communications between components on the computer network.

In order for communications to occur between physically connected heterogeneous networks, all components on the expanded network and the routers that connect them must adhere to a standard protocol. Computer networks connected to the Internet and to other networks usually use the TCP/IP Layering Model Protocol. As illustrated in FIG. 2, TCP/IP Layering Model comprises an application layer or (Layer 5) 202, a transport layer or (Layer 4) 204, an Internet layer or (Layer 3) 206, a network interface layer or (Layer 2) 208, and a physical layer or (Layer 1) 210. Application layer protocols 202 specify how each software application connected to the network uses the network. Transport layer protocols 204 specify how to ensure reliable transfer among complex protocols. Internet layer protocols 206 specify the format of packets sent across the network as well as mechanisms used to forward packets from a computer through one or more routers to a final destination. Network interface layer protocols 208 specify how to organize data into frames and how a computer transmits frames over the network; and physical layer protocols 210 correspond to the basic network hardware. By using TCP/IP Layering model protocols, any component connected to the network can communicate with any other component connected directly or indirectly to one of the attached networks.

FIG. 3-A illustrates a smart molecule system 316 that is embedded in a clock and connected to LAN 100 according to the preferred embodiment of the invention. It should be noted that smart molecule system 316 might be embedded in devices with or without display screens and/or larger or smaller physical devices. For example, smart molecule system 316 may be embedded in an office wall or in a multi-part, three-dimensional sculpture of steel. Smart molecule system 316 uses standard internetworking protocols, such as TCP/IP, to connect to other components on LAN 100. Thus, smart molecule system 316 may be connected to the Internet and the World Wide Web (Web) and information available therein is accessible to smart molecule system 316. Computer system 102 on LAN 100 to which smart molecule system 316 is connected is a smart molecule server and smart molecule system 316 is a smart molecule client. According to the invention, a software application in the smart molecule server 102 defines a smart molecule service 318 and assigns information from one or more information sources, such as databases or Internet sites, to smart molecule service 318. Thereafter, smart molecule system 316 subscribes to service 318.

FIG. 3-B further illustrates the stock-clock smart molecule system of FIG. 3-A. The wireless stock clock smart molecule system 316 includes a two-line textual LCD display 320, a number pad 322 and a set button 324 to subscribe to one or more smart molecule services 318. According to the invention illustrated in FIG. 3-A, stock-clock smart molecule system 316 enables the user to subscribe to a smart molecule service 318 that constantly transmits current stock values via the Internet. To subscribe to smart molecule service 318, a user enters a "URL To Number Transformation Algorithm" (UNT) number into stock-clock smart molecule system 316.

Figure 3A:
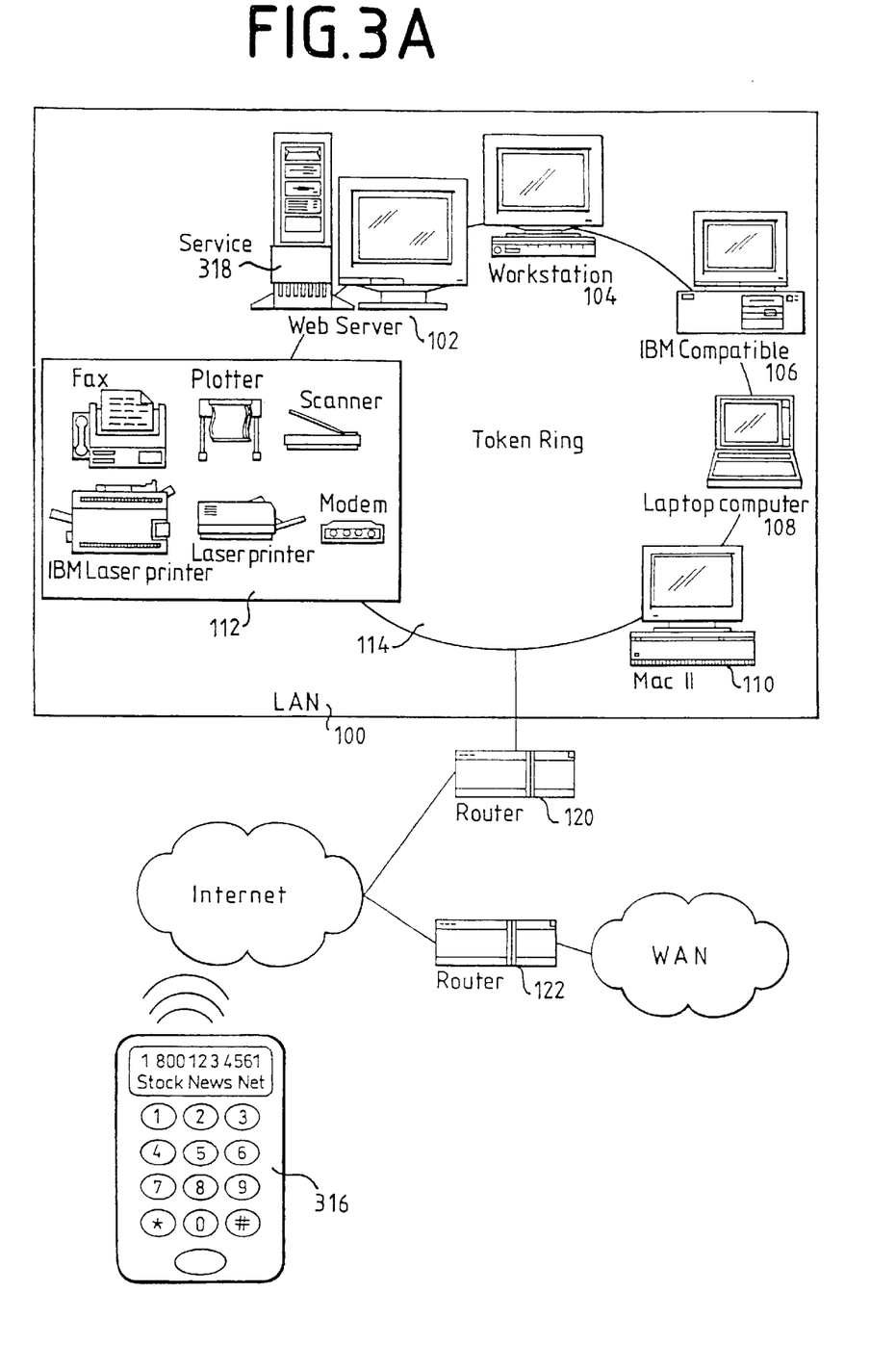
Figure 3B:
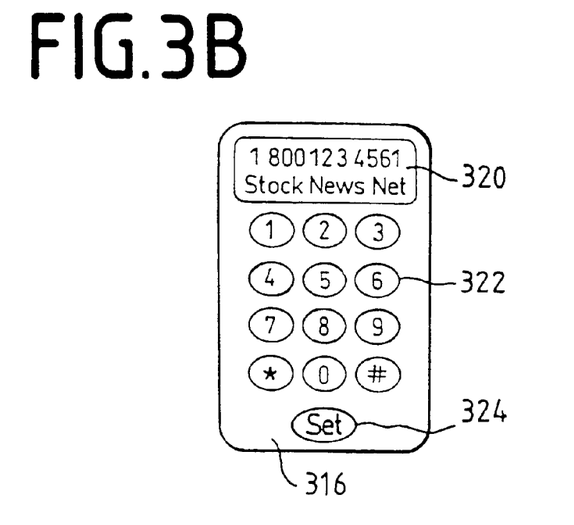
Figure 3C:
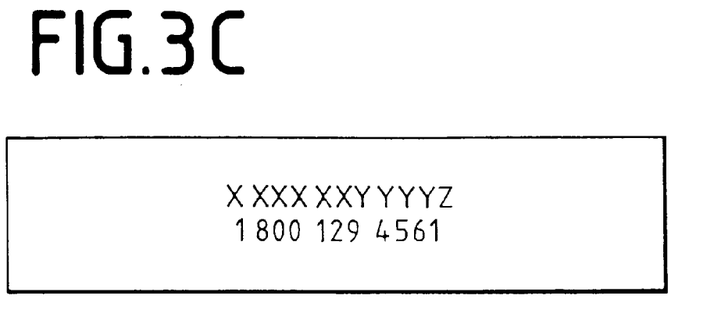

UNT performs a bi-directional transformation between a sequence of numbers and a URL. Thus, instead of requiring the user to enter a URL in order to obtain information from the web, the user may enter the corresponding UNT number. In the preferred embodiment of the invention, the UNT number format is the same as the telephone number format used in the United States. This format is easy to use and remember since it is already familiar to United States telephone users. It is also language independent and applicable worldwide and a physical device with a smart molecule system 316 does not require an alphanumeric keypad to retrieve information from the web. Moreover, the UNT domain registration and management fully complies with the Domain Name System (DNS) standard and the UNT domain names use relatively smaller spaces than alphanumeric domain names. By using extensions with more digits, UNT domain names are also virtually unlimited.

FIG. 3-C illustrates the UNT number format utilized in the preferred embodiment of the invention. Digits 1–(n–5), the X digits, define the domain name, digits (n–4)–(n–1), the Y digits, define a four digit service parameter, and digit n, the Z digit, defines a protocol and/or additional features. A default service parameter in the Y digits is defined with four zeros. Examples of protocols defined by the Z digit include zero for "http://" protocol and one for "https://" protocol.

FIG. 3-D illustrates how the UNT number and the corresponding URL are used in the stock-clock smart molecule system of FIG. 3-A. In order to set up the stock-clock smart molecule service 318 so that stock-clock smart molecule system 316 and other smart molecule systems can monitor stock symbols, a service provider registers an Internet domain name, www.180012.com, with the appropriate authorities. Then the service provider sets up smart molecule service 318 that runs a parameterized script on web server 102. Stock-clock smart molecule service 318 is set up to return the current values for stock symbols. Thereafter, the service provider assigns 3456 to a specific stock symbol and distributes the corresponding UNT number, 1 800 123 4561 to smart molecule systems 316. It should be noted that the service provider may assign other service parameters to other stock symbols and thereafter distribute the corresponding UNT number to the stock-clock smart molecule system and/or other smart molecule systems. This enables stock-clock smart molecule system 316 to connect to stock-clock smart molecule service 318 and retrieve the current stock values for the stock symbols. Thereafter, users of service 318 enter the UNT number in smart molecule system 316 and the UNT number is linked to http://www.188800.com/s.?p=9456 URL. It should be noted that smart molecule system 316 may connect to multiple smart molecule services 318 through one or more smart molecule servers 102.

Figure 3D:
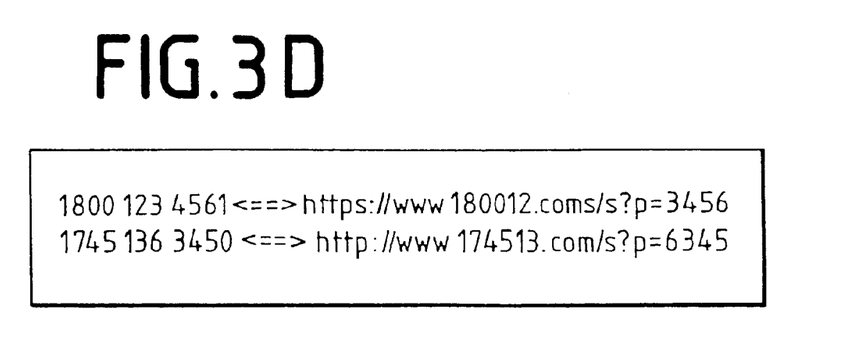

It should be noted that a user of smart molecule system 316 that is embedded in a physical device with alphanumeric keypad may enter the URL directly into the physical device. The user may then connect to the appropriate smart molecule service 318, and retrieve information transmitted from the associated web site through the smart molecule service 318.

Figure 4:
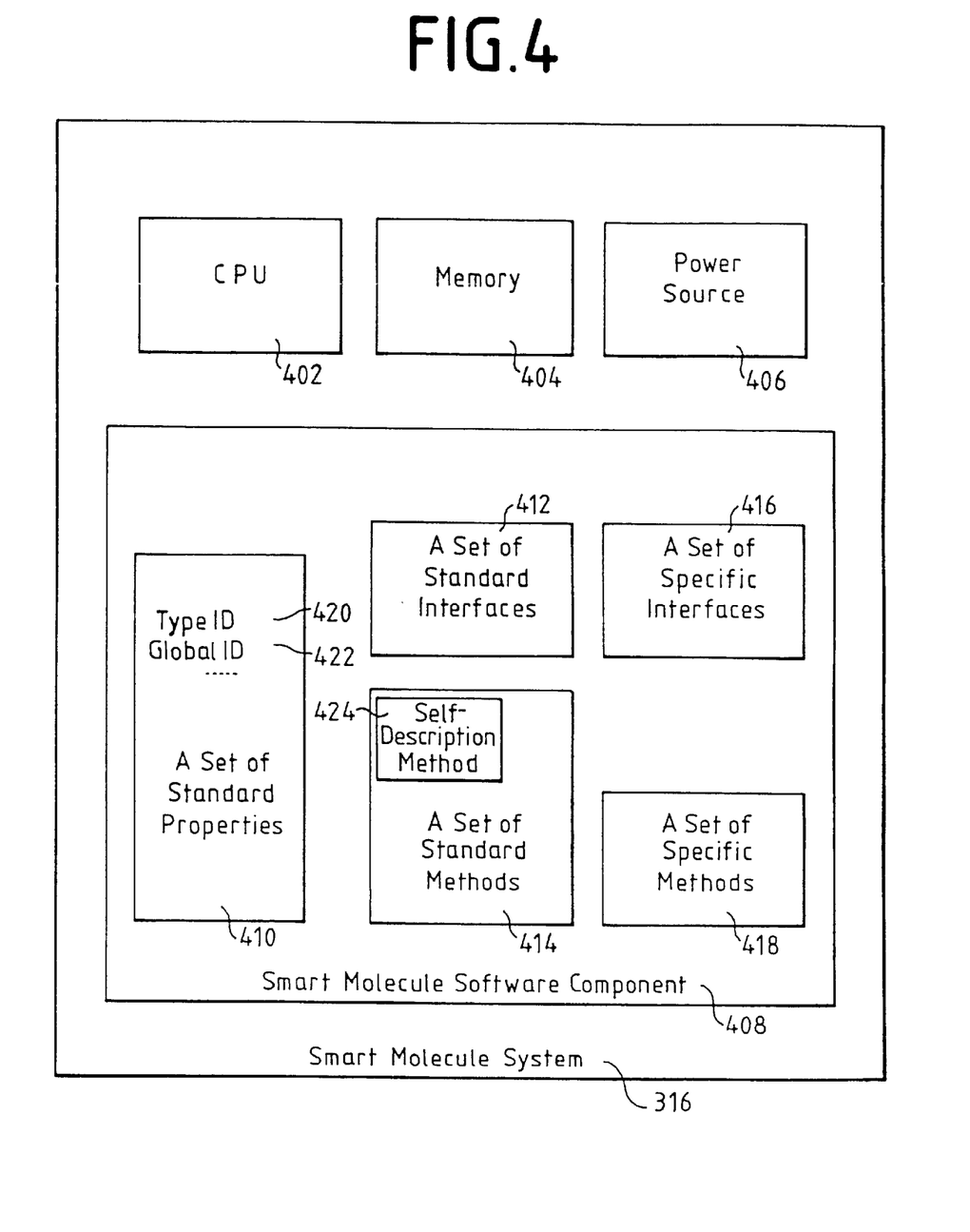
FIG. 4 further illustrates the smart molecule system embedded in a physical device.

FIG. 4 further illustrates smart molecule system 316 described in FIG. 3-A. Smart molecule system 316 comprises a central processor 402, a memory 404, a power source 406, and a smart molecule software component 408. In the preferred embodiment of the invention, smart molecule software component 408 is an object-oriented executable. It should be noted that other software applications, for example DLL or JAVA applets, may be used as the smart molecule software component 408.

Smart molecule software component 408 comprises a set of standard properties 410, a set of standard interfaces 412, a set of standard methods 414, a set of specific interfaces 416, and a set of specific methods 418. The set of standard properties 410 includes a type identifier 420 for identifying the types of information the smart molecule system processes and a unique global identifier 422 which is a unique address for identifying smart molecule system 316 to the network. Global identifier 422 does not change even if the physical device to which it is assigned is moved to a different location and/or removed from the network. An example of a standard interface 412 includes interfaces to network components, software components and other smart molecule systems. Examples of standard methods include a method for retrieving information transmitted to the smart molecule system's memory 404 and a smart molecule self-description method 424. An example of a specific interface 416 includes a wireless communications interface and an example of a specific method 418 includes a method for moving an attribute of a physical device in response to an event.

The service provider may use smart molecule server 102 to uniquely tailor smart molecule service 318 to a specific smart molecule system. Smart molecule server 102 uses the unique global identifier 422 of smart molecule system 316 to invoke the appropriate smart molecule self-description method 424. Thereafter, smart molecule self-description method 424 returns properties and methods for its smart molecule system 316 and for any smart atom systems attached to smart molecule system 316. It also returns a three-dimensional, object-oriented, vector-based description of the shapes for all attached smart molecule systems 316 and smart atom systems. This makes it easier to develop a smart organism, i.e., a computer network with multiple smart molecule systems 316, since a system developer may only have to click on the shape of a component to obtain information about that component.

According to the invention, after smart molecule service 318 is setup and the corresponding UNT numbers are distributed, a software application in smart molecule server 102 accesses information through the associated URL by using standard Internet technology. It formats the information into a predefined format that smart molecule client 316 'understands' and it transmits the formatted information to the smart molecule client's memory 404. Smart molecule software component 408 retrieves the information from memory 404 and processes the information in order to identify the occurrence of a predetermined event. Upon identifying the occurrence of the predetermined event, smart molecule software component 408 activates an attribute in the physical device. Thereafter, if there is physical interaction with a physical attribute in the physical device, smart molecule software component 408 determines whether a predefined task is assigned to the physical attribute. If a predefined task is assigned to the physical attribute with which there was interaction, smart molecule software component 408 then sends a predefined message/event to smart molecule server 102. Thereupon, smart molecule server 102 performs the predefined task. Smart molecule server 102 may also transfer scripts to the smart molecule system to define the smart molecule system's behavior in response to specific events.

In an alternate embodiment of the invention, smart molecule software component 408 may collect information in smart molecule memory 404 and transmit the information to smart molecule service. Thereafter, smart molecule service 318 or another software component in server 102 may process the information and/or distribute it to other sources.

Figure 5:
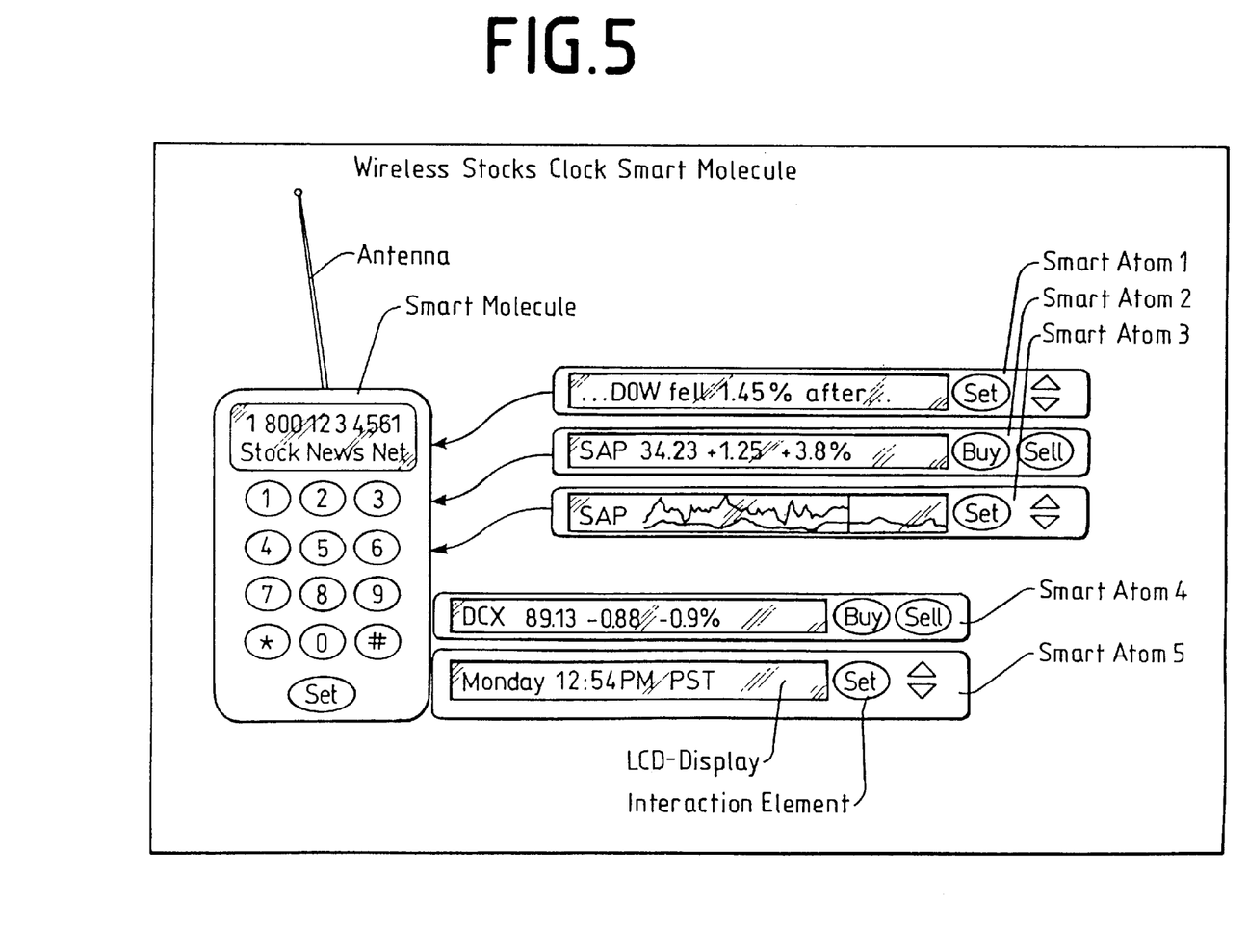
FIG. 5 illustrates a smart molecule system that is expanded by smart atom systems.

FIG. 5 illustrates a smart molecule system that is expanded by a smart atom system. The smart atom system is a software component or hardware component that performs one or more predefined tasks and it may be linked into the smart molecule system in order to increase the functions of the smart molecule system. Thus, manufacturers of a physical devices including smart molecule systems have greater the flexibility in customizing their products 316. Smart Atom 1 includes a set of up and down buttons and it displays an animated ticker text. Smart Atom 2 includes buy and sell buttons and it displays a stock value. Smart Atom 3 includes a set of up and down buttons and it displays a graph of a specific stock value. Smart Atom 4 displays an exception status and it has the same functionality as Smart Atom 2. Smart Atom 5 includes a set of up and down buttons and displays the current time and date.

To better understand the inventive system, consider the system in depicted in FIGS. 3-A and 3-B. Smart molecule system 316 is connected to the Internet through web server 102 and smart molecule system 316 may retrieve information from one or more financial databases through smart molecule server 102. The service provider registers the UNT number with the appropriate authorities and the software application in smart molecule server 102 defines stock-clock smart molecule service 318 and assigns information from one or more sources to service 318. The service provider publishes the UNT number and server 102 accesses the Internet to continuously retrieves information from the assigned databases and/or Web pages. The software component in smart molecule server 102 formats the information into a predefined format. When smart molecule system 316 connects to smart molecule service 318, server 102 transmits the information to the smart molecule memory 404 in the clock. Smart molecule software component 408 in the clock retrieves the information from memory 404 and processes it in order to identify the occurrence of a predetermined event. An example of a predetermined event is when selected stock prices reach a certain level. Upon identifying the occurrence of the predetermined event, smart molecule software component 408 activates an alarm in the clock. Thereafter, when the user presses set button 324 on the clock, smart molecule software component 408 determines whether a predefined task is assigned to the snooze button. If a predefined task is assigned to the snooze button, smart molecule software component 408 sends a predefined message/event to smart molecule server 102. An example of a predefined task is instructions to buy or sell a certain quantity of a particular stock. Upon receiving the message from smart molecule system 316, smart molecule server 102 executes the task through an on-line brokerage firm.

In yet another example, as stated above, smart molecule system 316 may be embedded in a multi-part, three-dimension sculpture located in the lobby of a global company. Smart molecule server 102 could assign publicly available corporate information, such as the company's stock value or worldwide revenue, to the smart molecule sculpture. Smart molecule software component 408 could change the color of the sculpture, or move parts of the sculpture to reflect changes in the stock or revenue value.

Figure 6:
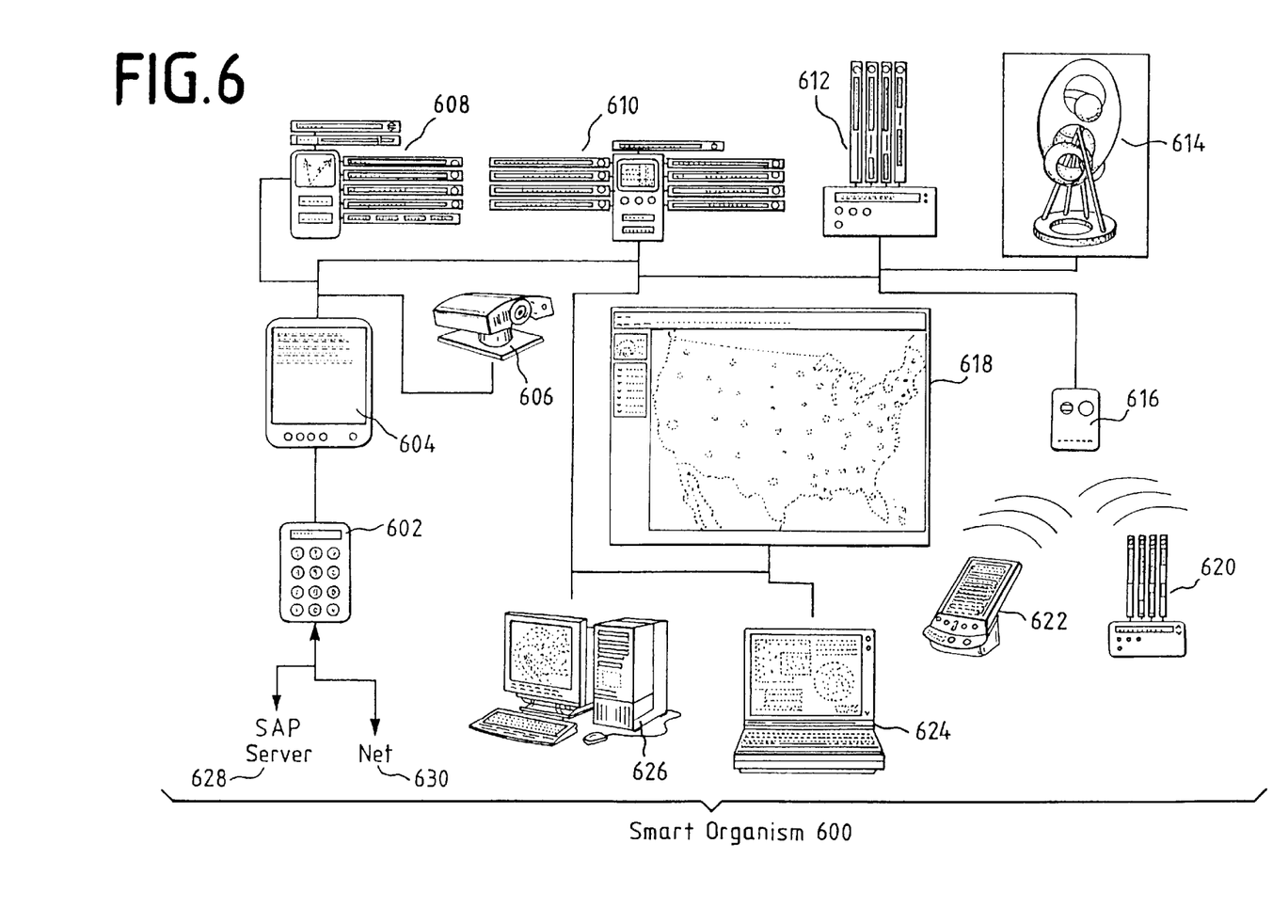
FIG. 6 illustrates a smart organism comprising multiple smart molecule systems embedded in various physical objects.

FIG. 6 illustrates a smart organism, i.e., a computer environment in which multiple smart molecule systems are embedded in various physical objects. The smart organism 600 comprises a security checking smart molecule system 602, a text display smart molecule system 604, a video conferencing smart molecule system 606, business display smart molecule systems 608–612, a smart molecule sculpture 614, a IR-Gateway smart molecule system 616, a large computer screen smart molecule system 618, a wireless connected smart molecule system 620, a wireless palmtop computer 622 with a smart molecule system, a laptop computer 624 with a smart molecule system, a personal computer 626 with a smart molecule system, a server 628 and a network 630. Security checking smart molecule system 602 may be used to check the identifiers of users logging on to the computer environment and text display smart molecule system 604 may be used to display assigned information such as stock ticker information. Video conferencing smart molecule system 606 may be activated by predefined interaction with one of the other smart molecule systems. Business display smart molecule systems 608–612 may be used to display different types of information and the functions of each system may be expanded with a smart atom system. Smart molecule sculpture 614 may be used to illustrate changing information and IR-Gateway smart molecule system 616 may be used to connect to the smart organism to wireless components, based on physical interaction with business display smart molecule system 612. Large computer screen 618 with smart molecule software component 408 may be used to display business reports that are generated on personal computer 626. Wireless connected smart molecule system 620 may be used for displaying data and wireless palmtop computer 622 may communicate with the computer environment though IR-Gateway smart molecule 616. Laptop computer 624 and personal computer 626 may be connected to the environment through standard Internet and network protocols. Server 628 and network 630 may be used to assign the smart molecule systems to information sources, to transmit data to the smart molecule systems and to process messages from the smart molecule systems.

Figure 7:
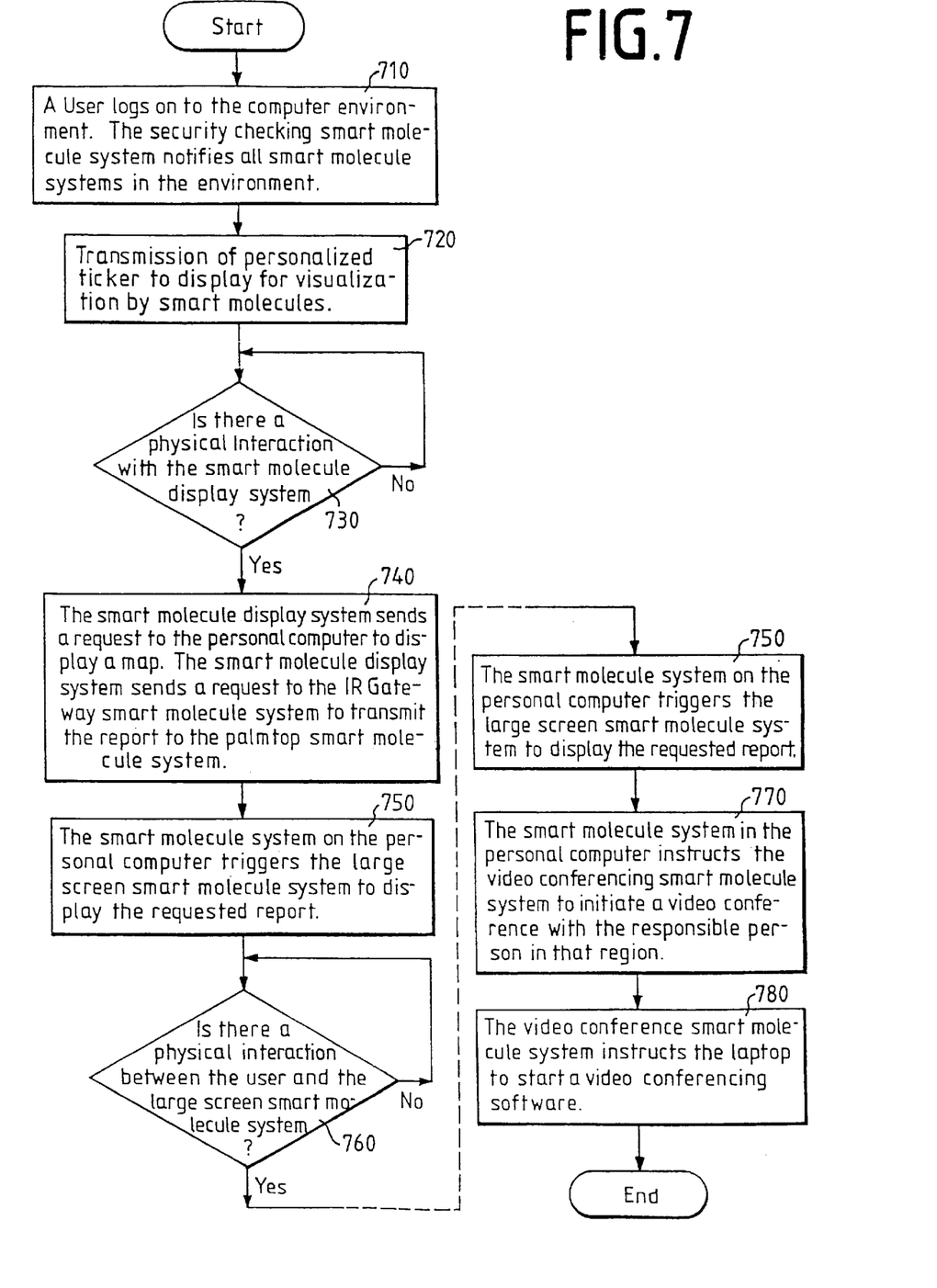
FIG. 7 illustrates how information is process in the computer environment depicted in FIG. 6.

FIG. 7 is a flowchart showing how information is process in the computer environment of FIG. 6. In Step 710, a user logs on to the computer environment using security checking smart molecule system 602. The security checking smart molecule system verifies that the logon is correct and notifies all smart molecule systems in the environment. In Step 720, the latest personalized ticker news from the network is transmitted to text display smart molecule system 604 for display. Key performance indicator information is transmitted to smart molecule systems 608–612 for display. Customer satisfaction information is transmitted to smart molecule sculpture 614, and the smart molecule system therein rotates the sculpture at a rate that corresponds to the level of customer satisfaction. In Step 730, smart molecule display system 610 waits for physical interaction from the user. In Step 740, if there is physical interaction, the smart molecule display system 610 sends a request to the smart molecule system in the personal computer 626 to display a map based on the key performance indicators report and it sends a request to the IR Gateway smart molecule system 616 to transmit the report to palmtop smart molecule system 622 for later offline analysis. In Step 750, the smart molecule system on the personal computer 626, triggers large screen smart molecule system 618 to display the requested report. In Step 760, the large screen smart molecule system 618 waits for physical interaction from the user. In Step 770, when the user touches a part of report in a particular region, the smart molecule system in personal computer 626 instructs video conferencing smart molecule system 606 to initiate a video conference with the responsible person in that region. In Step 780 video conferencing smart molecule system 606 instructs laptop 624 to start a video-conferencing software application. While the above illustrates limited interactions between the smart molecule systems, these and other types of interactions between smart molecule systems may continue until the user logs out of the computer environment.

As illustrated in the above examples, the smart molecule system is not dependent on traditional computer display and interaction devices, such as monitors or printers, to transmit information to a user. As information needs change, assignment to various information sources may also change. This yields rapid reaction to dynamic information.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A system for retrieving information from an external information source via a network and integrating external information with a physical device, the system comprising:
   a. a central processor for controlling processing operations, transmitting a unique global identification number, wherein the unique global identification number provides a set of properties describing at least one physical attribute of the device, and receiving formatted content information from the external information source via the computer network, the external information source identified and the information formatted based on a content delivery service subscribed to by the system and the set of properties describing the at least one physical attribute of the device;
   b. a memory for storing the formatted information; and
   c. a software component for processing the formatted information stored in the memory to identify the occurrence of an event, and alerting a user to the occurrence of an event by changing a state of the at least one physical attribute of the physical device.

2. The system of claim 1, further comprising means for recording a response by the user to the changing state of the physical device.

3. The system of claim 2, further comprising means for initiating a predefined task based on the user's response.

4. The system of claim 2, further comprising a wireless interface for receiving the formatted content information from the external information source.

5. The system of claim 4, wherein the wireless interface is further capable of transmitting instructions to the physical device for changing the state of the at least one physical attribute of the physical device.

6. The system of claim 5, wherein the wireless interface is further capable of receiving an indication of the user's response to the changing state of the physical device.

7. The system of claim 1, further comprising means for subscribing to a content delivery service for identifying and formatting the information from the external information source.

8. The system of claim 7, wherein the means for subscribing comprises:
   means for transmitting a transformation number that is linked to a URL of a web site to the content delivery service via the network.

9. The system of claim 8, further comprising:
   means for permitting the user to select the transformation number.

10. The system of claim 1, wherein the memory is further configured to store the unique global identifier permanently associated with the system.

11. The system of claim 1, wherein the formatted information from the external information is transmitted to the system based in part on the unique global identifier.

12. The system of claim 1, further comprising:
    means for distributing the information to other network devices operatively connected to the system.

13. The system of claims 1, 2, 3, 4, 5, 6, 7, 8, 9, 10, 11, or 12, wherein the system is embedded in the physical device.

14. The system of claim 1, wherein the physical attribute of the device comprises at least one of shape, dimension, or color.

15. The system of claim 1, wherein the physical attribute of the device is a three-dimensional, object-oriented, vector-based description of the shape of the device.

16. A method of activating a physical device based on content information from an external information source, the method performed by a system operatively connected to a server, the method comprising:
    connecting to the server, wherein the server is connected to at least one content delivery service;
    transmitting to the server a unique global identification number, wherein the unique global identification number provides the server with at least one physical attribute of the device;
    receiving, from the server, formatted content information, wherein the server formats the content based on the at least one physical attribute of the device;
    processing the formatted content information to identify the occurrence of an event;
    alerting a user to the occurrence of an event by changing a state of at least one physical attribute of the physical device;
    recording a response by the user to the changing state of the physical device; and
    initiating a predefined task based on the response by the user.

17. The method of claim 16, further comprising:
    subscribing to the content delivery service that accesses the external information source and formats the content information into a format predefined by the at least one physical attribute of the device.

18. The method of claim 17, wherein the step of subscribing to a content delivery service further comprises:

subscribing to the content delivery service by transmitting a transformation number that is linked to a URL of a web site to the content delivery service via the network.

19. The method of claim 18, further comprising:

permitting the user to enter the transformation number.

20. The method of claim 16, wherein the step of recording a response by the user to the changing state of the physical device comprises:

recording physical interaction by the user with the physical device, the physical interaction involving the user touching the physical device.

21. The method of claim 16, wherein the step of alerting a user to the occurrence of an event by changing the state of the physical attribute of the physical device comprises:

visually altering the physical appearance of the physical device to alert the user.

22. The method of claim 16, wherein the step of alerting a user to the occurrence of an event by changing the state of the physical attribute of the physical device comprises:

emitting a sound from the physical device to alert the user.

23. The method of claim 16, wherein the step of alerting a user to the occurrence of an event by changing the state of the physical attribute of the physical device comprises:

moving the physical device to alert the user.

24. The method of claim 16, wherein the step of initiating a predefined task based on the user's response comprises:

distributing the formatted content information to other devices operatively connected to the system.

25. The method of claim 16, wherein the step of initiating a predefined task based on the user's response comprises:

distributing second formatted information to other devices operatively connected to the system, wherein the second formatted information is tailored for each individual device.

26. The method of claim 16, wherein the physical attribute of the device comprises at least one of shape, dimension, or color.

27. The method of claim 16, wherein the physical attribute of the device is a three-dimensional, object-oriented, vector-based description of the shape of the device.

28. The method of claim 16, further comprising:

displaying a continuous stream of formatted content information.

29. A method of providing content information from an information source to a device, the method preformed by a server operationally connected to the device, the method comprising:

receiving a unique global identification number of the device;

processing the unique global identification number to generate a set of physical parameters describing the shape and physical properties of the device;

receiving content information from the information source;

formatting content information based on the unique global identification number and the physical parameters of the device; and transmitting the formatted content information to the device.

\* \* \* \* \*

UNITED STATES PATENT AND TRADEMARK OFFICE
CERTIFICATE OF CORRECTION

PATENT NO.    : 6,539,423 B1
DATED         : March 25, 2003
INVENTOR(S)   : Peter Ebert It is certified that error appears in the above-identified patent and that said Letters Patent is hereby corrected as shown below:

<u>Column 14,</u>
Line 15, "preformed" should read -- performed --.

Signed and Sealed this

Twelfth Day of August, 2003

JAMES E. ROGAN
*Director of the United States Patent and Trademark Office*